United States Patent
Becklin et al.

(10) Patent No.: US 11,597,563 B2
(45) Date of Patent: Mar. 7, 2023

(54) BUNDLE-DROP ROLLER

(71) Applicant: Arizona Arsenal L.L.C., Eloy, AZ (US)

(72) Inventors: Dennis Sterling Becklin, Grants Pass, OR (US); Steve Curtis, Eloy, AZ (US)

(73) Assignee: Arizona Arsenal L.L.C., Eloy, AZ (US)

( * ) Notice: Subject to any disclaimer, the term of this patent is extended or adjusted under 35 U.S.C. 154(b) by 1053 days.

(21) Appl. No.: 16/280,019

(22) Filed: Feb. 19, 2019

(65) Prior Publication Data

US 2019/0256255 A1    Aug. 22, 2019

Related U.S. Application Data

(60) Provisional application No. 62/632,376, filed on Feb. 19, 2018.

(51) Int. Cl.
| | | |
|---|---|---|
| *B65D 3/00* | (2006.01) |
| *B65D 25/20* | (2006.01) |
| *B65D 3/04* | (2006.01) |
| *B65D 90/18* | (2006.01) |
| *B62B 3/00* | (2006.01) |
| *B62B 3/10* | (2006.01) |
| *B62B 5/00* | (2006.01) |

(52) U.S. Cl.
CPC ............. *B65D 25/20* (2013.01); *B65D 3/04* (2013.01); *B65D 90/18* (2013.01); *B62B 3/008* (2013.01); *B62B 3/104* (2013.01); *B62B 5/0086* (2013.01)

(58) Field of Classification Search
CPC .......... B65D 25/20; B65D 3/04; B65D 90/18; B62B 3/008; B62B 3/104
See application file for complete search history.

(56) References Cited

U.S. PATENT DOCUMENTS

| | | | | |
|---|---|---|---|---|
| 3,837,666 | A | * | 9/1974 | Hodson ................. B65F 1/1468 280/47.131 |
| 4,026,570 | A | * | 5/1977 | Feinberg ............. B60B 33/0002 16/30 |
| 4,086,680 | A | * | 5/1978 | Kelly ...................... A47L 9/009 280/47.32 |

(Continued)

FOREIGN PATENT DOCUMENTS

| | | |
|---|---|---|
| DE | 202 10 692 | 12/2003 |
| EP | 2 803 600 | 11/2014 |

OTHER PUBLICATIONS

International Search Report and Written Opinion of the International Searching Authority completed Apr. 24, 2019, in International Patent Application No. PCT/US2019/018656, 7 pages.

(Continued)

*Primary Examiner* — Hau V Phan
(74) *Attorney, Agent, or Firm* — Lowe Graham Jones PLLC

(57) ABSTRACT

Embodiments are directed to improving transportation of tubular structures. A roller may have a housing having a vertical axis and one or more upper flanges. The one or more upper flanges may have an upper surface that is transverse and non-perpendicular to the vertical axis of the housing. Optionally, the upper surface may be curved. The roller may have one or more wheels that are rotatably coupled to the housing and that extend downward from the housing.

18 Claims, 10 Drawing Sheets

(56) References Cited

U.S. PATENT DOCUMENTS

| | | | | | |
|---|---|---|---|---|---|
| D292,873 | S | * | 11/1987 | Chen | .................................. 16/30 |
| 5,136,751 | A | * | 8/1992 | Coyne | ................. B60B 33/0013 |
| | | | | | 16/31 R |
| 5,292,140 | A | * | 3/1994 | Laing | ................... B62B 5/0083 |
| | | | | | 280/79.5 |
| 6,279,926 | B1 | * | 8/2001 | Taube | .................. B62B 5/0083 |
| | | | | | 280/37 |
| 6,694,894 | B1 | | 2/2004 | Darnell | |
| 7,331,454 | B2 | * | 2/2008 | Godshaw | ................. B25H 3/02 |
| | | | | | 190/117 |
| 7,575,246 | B1 | * | 8/2009 | Lunski | ................. B65F 1/1473 |
| | | | | | 280/47.16 |
| 7,762,566 | B2 | * | 7/2010 | Wang | .................... B62B 5/0083 |
| | | | | | 280/651 |
| 8,162,329 | B1 | * | 4/2012 | Openshaw | .............. B62B 1/268 |
| | | | | | 280/47.131 |
| 8,413,775 | B2 | * | 4/2013 | Tong | ........................ A45C 5/14 |
| | | | | | 190/18 R |
| 8,657,309 | B2 | * | 2/2014 | Taylor | ................. B60B 33/0007 |
| | | | | | 280/80.1 |
| 8,955,857 | B1 | * | 2/2015 | Kunkel | .................. B62B 3/104 |
| | | | | | 280/47.34 |
| 9,834,037 | B2 | * | 12/2017 | Carter | .................... B62B 1/008 |
| 9,845,125 | B1 | * | 12/2017 | Liu | ....................... B62B 5/0083 |

OTHER PUBLICATIONS

Military Tethered Tandem Bundles, Butler Parachute Systems, 2019, web capture of https://www.butlerparachutes.com/military-parachutes/tethered-tandem-bundle/ on Jun. 27, 2019, including enlarged photograph from same, 2 pages.

* cited by examiner

BUNDLE-DROP ROLLER

CROSS-REFERENCE TO RELATED APPLICATIONS

This application claims the benefit of priority from U.S. Provisional Patent Application No. 62/632,376, filed Feb. 19, 2018, and entitled BUNDLE-DROP ROLLER, which application is incorporated herein by reference in its entirety.

FIELD OF THE INVENTION

This invention relates to rollers for containers.

BACKGROUND OF THE INVENTION

Tubular structures, such as concrete forms including cylindrical cardboard tubes available under the mark SONO-TUBE®, are often used as containers to transport cargo by way of airlifts, such as airdrops. The tubular structures are at least partially filled with supplies and then carried to aircraft. The tubular structures have shapes and dimensions that make them challenging and awkward to carry. Thus, it is with respect to these considerations and others that the present invention has been made.

SUMMARY OF THE INVENTION

In one aspect of the invention a system includes a container having an outer surface conforming to a cylindrical shape defining an axis of symmetry. The system further includes a plurality of roller assemblies mounted to the container, each of the roller assemblies having one or more wheels, the plurality of roller assemblies being mounted such that the container may be supported on the wheels of the plurality of roller assemblies when rested on a flat surface. The roller assemblies each define at least two surfaces that are tangent to the container at at least two angular positions about the axis of symmetry. In some embodiments, the container a cardboard cylinder.

In some embodiments, each roller assembly of the plurality of roller assemblies includes a plurality of wheels that are distributed in a row parallel to the axis of symmetry. In some embodiments, each wheel defines an axis of rotation that is perpendicular to the axis of symmetry. In some embodiments, the plurality of roller assemblies include a first roller assembly and a second roller assemblies that are located at overlapping positions along the axis of symmetry and located at different angular positions about the axis of symmetry. Some embodiments further include a cross brace fastened to the first roller assembly and the second roller assembly.

In some embodiments, the one or more wheels of each roller assembly of the plurality of roller assemblies includes a plurality of wheels. Each roller assembly of the plurality of roller assemblies may include a roller housing including a first vertical wall and a second vertical wall, the plurality of wheels being positioned between the first vertical wall and the second vertical wall. The at least two surfaces may include a first flange on the first vertical wall and a second flange on the second vertical wall. In some embodiments, the first flange defines a first angle relative to the first vertical wall and the second flange defines a second angle relative to the second vertical wall, the second angle being greater than the first angle.

In some embodiments, the roller housing includes a bottom wall, a lower edge of the first vertical wall securing to a first edge of the bottom wall, a lower edge of the second vertical wall securing to a second edge of the bottom wall opposite the first edge, the bottom wall defining a plurality of openings and a portion of each wheel of the plurality of wheels protruding outwardly from one of the openings of the plurality of openings. In some embodiments, the first vertical wall, bottom wall, second vertical wall, first flange, and second flange are formed of a single sheet of metal.

In some embodiments, the roller housing further includes an end cap extending between the first vertical wall and second vertical wall, the end cap having an upper edge defining a radius of curvature sized to conform to the cylinder when in contact with the first surface and the second surface.

A corresponding method of use may include fastening the first flange and the second flange of each roller assembly to the container such that a first portion of the roller assemblies are on one side of a vertical plane intersecting the axis of symmetry and a second portion of the roller assemblies are on a second side of the vertical plane opposite the first side and such that the rollers of the first portion of the roller assemblies are substantially aligned parallel to the axis of symmetry and the rollers of the second portion of the roller assemblies are substantially aligned parallel to the axis of symmetry.

The method of use may further include positioning one or more cross braces between a roller assembly of the first portion and a roller assembly of the second portion prior to fastening the flanges to the cylinder. The cross brace may be removed following fastening.

BRIEF DESCRIPTION OF THE DRAWINGS

The preferred and alternative embodiments of the present invention are described in detail below with reference to the following drawings.

DETAILED DESCRIPTION OF THE PREFERRED EMBODIMENT

Various embodiments now will be described more fully hereinafter with reference to the accompanying drawings, which form a part hereof, and which show, by way of illustration, specific example embodiments by which the invention may be practiced. The embodiments may, however, be embodied in many different forms and should not be construed as limited to the embodiments set forth herein; rather, these embodiments are provided so that this disclosure will be thorough and complete and will fully convey the scope of the embodiments to those skilled in the art. Among other things, the various embodiments may be methods, systems, or devices. The following detailed description is, therefore, not to be taken in a limiting sense.

Throughout the specification and claims, the following terms take the meanings explicitly associated herein, unless the context clearly dictates otherwise. The phrase "in one embodiment," "in one implementation," or "in one example" as used herein does not necessarily refer to the same embodiment, implementation, or example, though it may. Furthermore, the phrase "in another embodiment," "in another implementation," or "in another example" as used herein does not necessarily refer to a different embodiment, implementation, or example, although it may. Thus, as described below, various embodiments or implementations may be readily combined, without departing from the scope or spirit of the invention.

In addition, as used herein, the term "or" is an inclusive "or" operator and is equivalent to the term "or," unless the context clearly dictates otherwise. The term "based on" is not exclusive and allows for being based on additional factors not described, unless the context clearly dictates otherwise. In addition, as used herein, the meanings of "a," "an," and "the" include plural references. Also, as used herein, plural references are intended to also disclose the singular, unless the context clearly dictates otherwise. The meaning of "in" includes "in" and "on." Further, as used herein, the terms "of" and "for" refer to both the meaning of the term "of" and the meaning of the term "for" in the sentence or phrase in which one or the other is employed (although they may have the same meaning), unless the context clearly dictates otherwise. Also, as used herein, the use of "when" and "responsive to" do not imply that associated resultant actions are required to occur immediately or within a particular time period, unless the context clearly dictates otherwise. Instead, they are used herein to indicate actions that may occur or be performed in response to one or more conditions being met, unless the context clearly dictates otherwise.

Figure 1A:
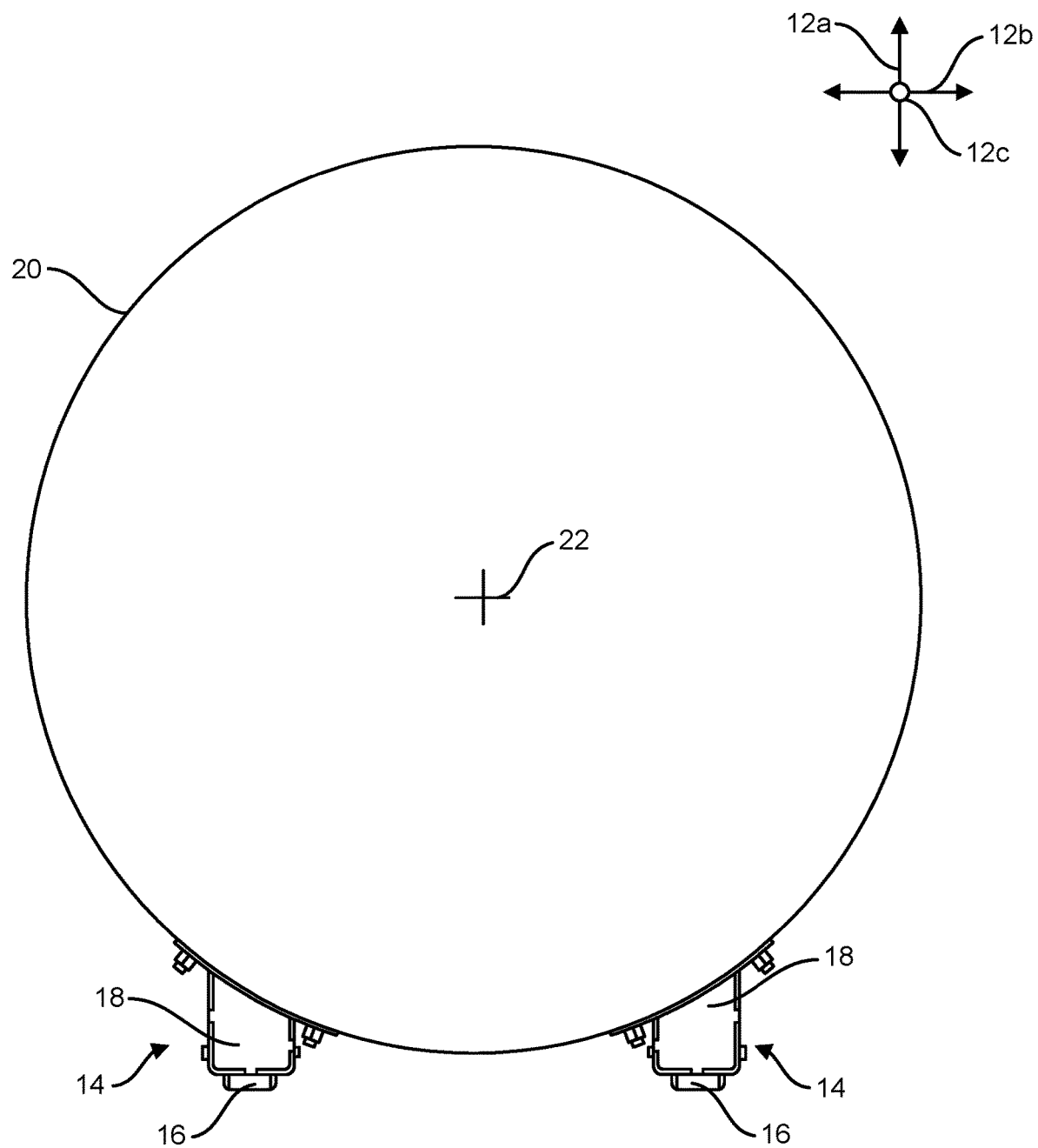
FIG. 1A shows an end view of an example bundle-drop roller system having a tubular container structure and a pair of rollers in accordance with an embodiment of the present invention.

FIG. 1A shows an example bundle-drop roller system 10. The system 10 may be understood with respect to a vertical direction 12a, horizontal direction 12b, and a longitudinal direction 12c (12c pointing into/out of the page in FIG. 1A). As described below, the system 10 provides for rolling on a surface. Such a surface will be substantially parallel to the horizontal and longitudinal directions 12a, 12b as defined by the system 10. As used in the disclosure herein "substantially" with reference to an angle shall be understood to mean within 5 degrees of the angle, e.g., substantially equal to an angle, substantially parallel, substantially perpendicular, substantially tangent, substantially co-planar, etc.

The system 10 includes one or more roller assemblies 14 having one or more wheels 16 or rollers 16 included in each assembly 14. The rollers 16 are rotatably fastened within roller housings 18. In some embodiments, the rollers 16 are embodied as skateboard wheels. The roller housings fasten to a container 20, that is at least one of a cylinder or a structure having portions of its surface that conform to a cylinder. The cylinder may be defined with respect to an axis of symmetry 22, e.g., the cylinder is circular about an axis of symmetry 22. In the illustrated embodiment, the axis of symmetry 22 is substantially parallel to the longitudinal direction 12c. In some embodiments, the longitudinal direction 12c may be defined as being parallel to the axis of symmetry 22. When the roller assemblies 14 are in use for supporting the container 20, the axis of symmetry is substantially parallel to a support surface with which the rollers 16 of the roller assemblies 14 are engaged.

In the illustrated embodiment, there are two roller assemblies 14 that are positioned on either side of a plane parallel to the vertical and longitudinal directions 12a, 12c and intersecting the axis of symmetry 22. Stated differently, the roller assemblies are located at different angular positions about the axis of symmetry 22. The roller assemblies 14 may be positioned such that their positions along the axis of symmetry 22 partially or substantially entirety (>90% of their lengths). In other embodiments, a single roller assembly may be centered on this plane and be of sufficient width to resist tipping of the container 20.

As shown in FIG. 1A, the roller housings 18 may be embodied a box or frame that project downwardly from a cylindrical surface of the container 20 substantially parallel to the vertical direction 12a. The rollers 16 are positioned between walls of this box or frame and protrude partially downwardly from the lower surface of this box or frame.

The rollers 16 of the roller assemblies may defined axes of rotation that are perpendicular to the axis of rotation 16. In the illustrated embodiment, the centers of the rollers 16 lie substantially in (e.g., within 5 mm of) a plane that is parallel to the axis of symmetry 22 and offset therefrom and the axes of rotation of the roller are al substantially parallel to this plane.

Figure 1B:
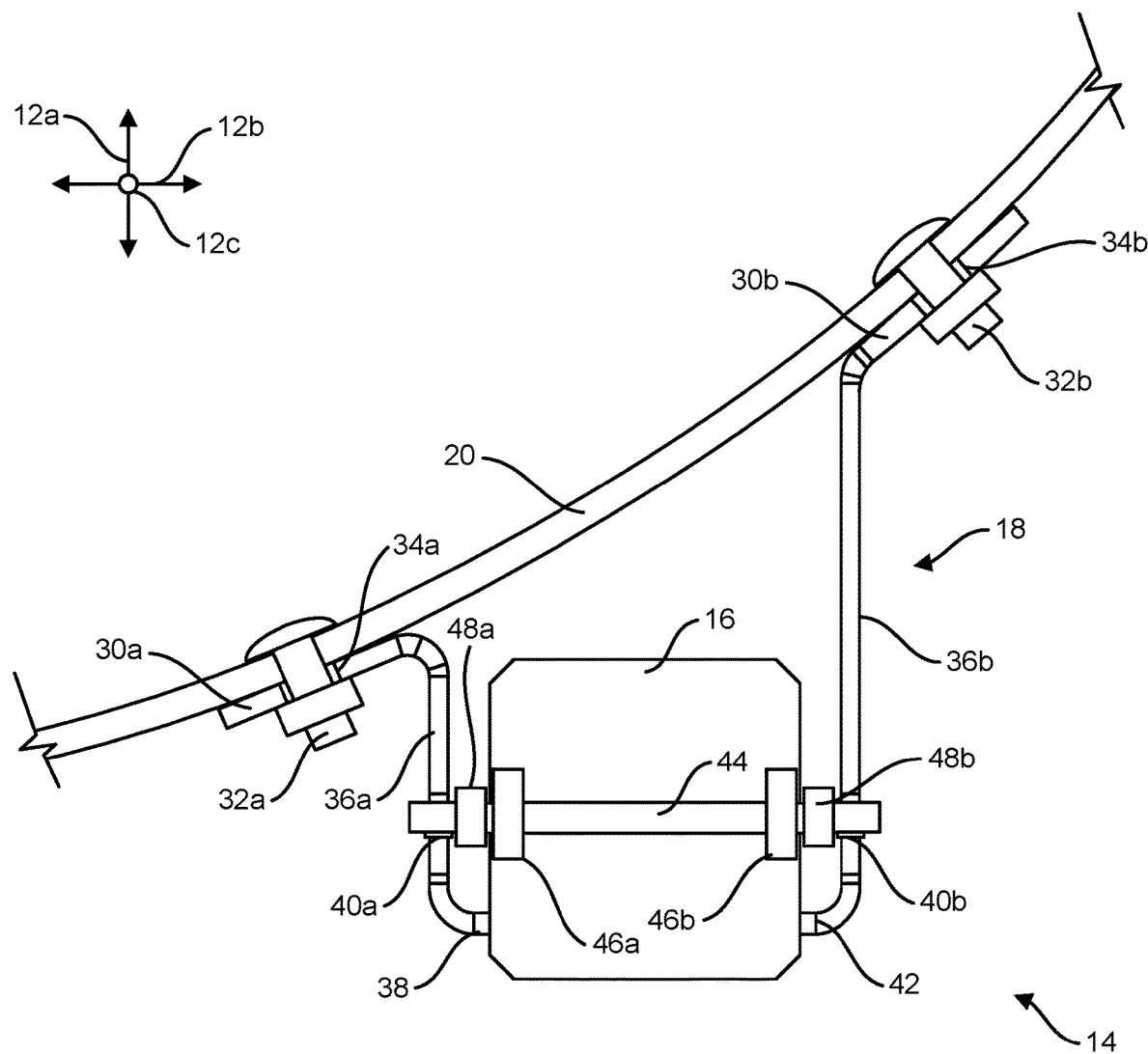
FIG. 1B illustrates partial cross sectional view of a roller assembly and tubular container in accordance with the embodiment of FIG. 1A.

FIG. 1B shows a detailed illustration of an example implementation of the rollers 16 and the roller housing 18. In the illustrated example, the roller housing 18 includes two flanges 30a, 30b that are at different angles relative to the vertical direction such that for a given container 20 defining a cylinder with a given radius, the flanges 30a, 30b may be positioned such that they both contact the cylindrical portion of the container 20 and are substantially tangent to the cylinder at their points of contact. In particular, the flanges 30a, 30b have planar surfaces that extend along the extent of the roller housing along the longitudinal direction 12c and that contact the container such that these surfaces are substantially tangent to the cylinder at their points of contact. In alternative embodiments, the flanges 30a, 30b may be cylindrical and conform to the cylinder defined by the container 20.

As is apparent in FIG. 1B the angles of the flanges 30a, 30b relative to the vertical direction 12a in a vertical plane parallel to the vertical and horizontal directions 12a, 12b are unequal such that the position along the surface of the cylinder at which the flanges 30a, 30b both make substantially tangential contact is offset from the axis of symmetry 22 along the horizontal direction 12b. In embodiments where a single roller assembly 14 is used, or a single row of roller assemblies 14 arranged along the longitudinal direction 12c, the angles of the flanges 30a, 30b may be equal. In the illustrated embodiment, the flanges 30a, 30b protrude outwardly from other parts of the roller assembly 114.

The flanges 30a, 30b may secure to the container 30a, 30b by various means. For example, one or more flange fasteners 32a may include nuts and bolts, hook-and-loop fasteners, adhesive, or others that are at least strong enough in combination to secure the roller assembly 14 to the container 20 despite the lateral outward force provided by the weight of the container 20 and its contents. In the illustrated embodiment, the fasteners 32a, 32b pass through apertures 34a, 34b in the flanges 30a, 30b and through the container 20. Each flange 30a, 30b may define multiple apertures 34a, 34b distributed along the longitudinal direction 12b in order to provide sufficient attachment locations to the container 20 to resist expected loading.

In the illustrated embodiment, flange 30a secures to a sidewall 36a and flange 30b secures to a sidewall 36b. In the illustrated embodiments, the walls 36a, 36b both have inner and outer surfaces that are substantially vertical, i.e. extend substantially parallel to the vertical and longitudinal directions 12a, 12b. Each wall 36a, 36b extends downwardly from the flanges 30a, 30b and connects to an edge of a bottom wall 38, such as by way of curved transition between the walls 36a, 36b and the bottom wall 38. The bottom wall 38 may have upper and lower surfaces substantially parallel to the horizontal and longitudinal directions 12b, 12c.

In some embodiments, the flange 30a, wall 36a, bottom wall 38, wall 36b, and flange 30b are a single continuous sheet of plastic or metal (e.g., stainless steel, aluminum, etc.) that is milled, cut, or otherwise machined and bent to have the illustrated structures of the roller housing 18. Cutting of the outline of the housing 18 and the various apertures 34a, 34b, 40a, 40b, 42a, 42b may be performed before or after the sheet of metal is bent into the illustrated shape. Some features may be cut before bending and others after. Features in the sheet may be formed with a computer numerical control (CNC) brake after laser cutting the sheet and bending the sheet to the illustrated shape. In some embodiments, container 20 and roller housings 18 may be integral to each other, with both the container 20 and the roller housings 18 being molded polymer or composite material The sidewall 36a may define axle openings 40a that are each substantially (e.g., within 2 mm) aligned along the vertical and longitudinal directions 12a, 12c with a corresponding opening 40b defined by the sidewall 36b. The bottom wall 38 may define bottom openings 42 such that each bottom opening is substantially centered (e.g., within 5 mm) on the openings 40a or 40b along the longitudinal direction 12c.

When assembled, an axle 44 passes through a pair of aligned openings 40a, 40b along with a roller 16 positioned between the aligned openings 40a, 40b and a portion of the roller 16 protrudes outwardly through the bottom opening 42 centered on the aligned openings 40a, 40b. The amount by which the roller protrudes outwardly through the bottom opening 42 may be between 10 and 30 percent of a radius of the roller about its axis of rotation.

In the illustrated embodiment, the axle 44 passes through one or more roller bearings 46a, 46b fastened within the roller 16, such as cartridge roller bearings, such that rotation of the axle 44 is not required in order for the roller 16 to rotate. In the illustrated embodiment, the axle 44 may additionally pass through spacers 48a, 48b, e.g., cylinders defining holes, positioned between the sidewall 36a and the roller 16 and between the roller 16 and the sidewall 36b, respectively. The spacers 48a, 48b may urge the roller 16 to remain centered within the bottom opening 42 along the horizontal direction 12c and avoid rubbing against sides of the bottom opening 42.

Figure 1C:
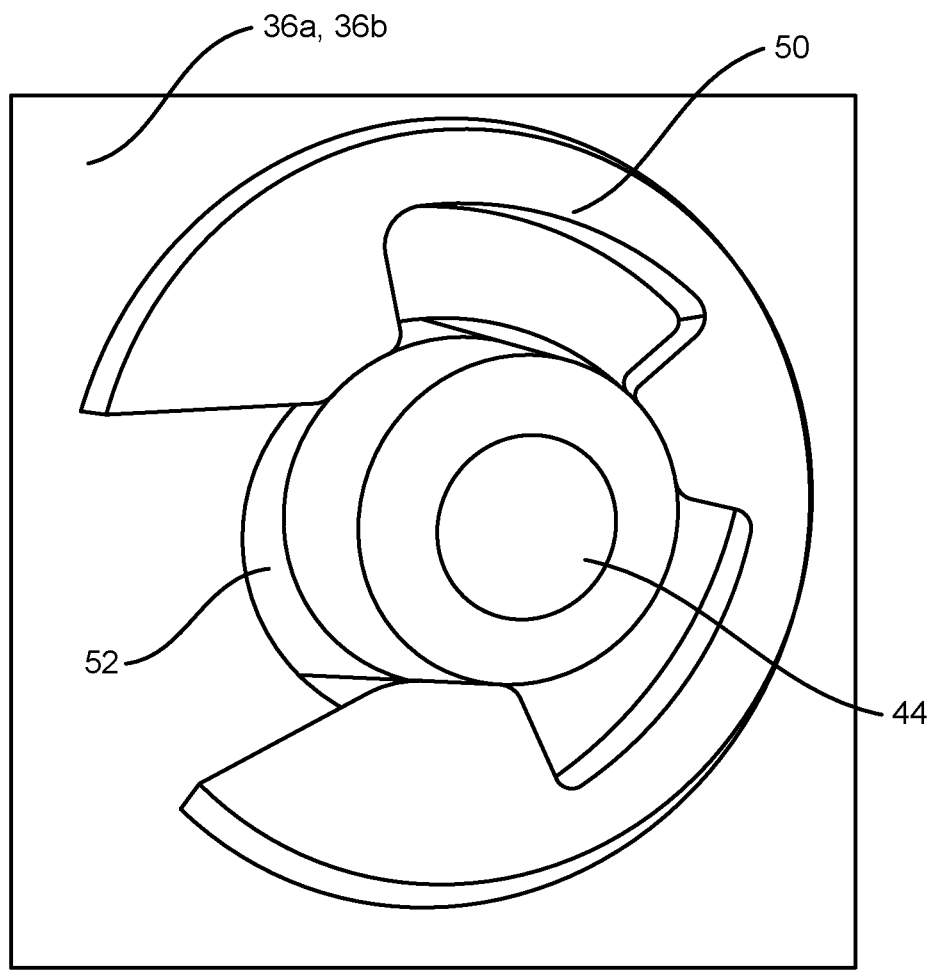
FIG. 1C illustrates a fastening means for the roller assembly of FIGS. 1A and 1B.

Referring to FIG. 1C, in some embodiments, removal of the axle 44 is resisted by one or more snap rings 50 or C-clips 50 engaging grooves 52 in ends of the axle 44. In some embodiments, the axle 44 includes a fixed (e.g., monolithically formed) enlarged head on one end and a groove 52 at the other end to receive a snap ring such that only one snap ring is used.

Figure 2:
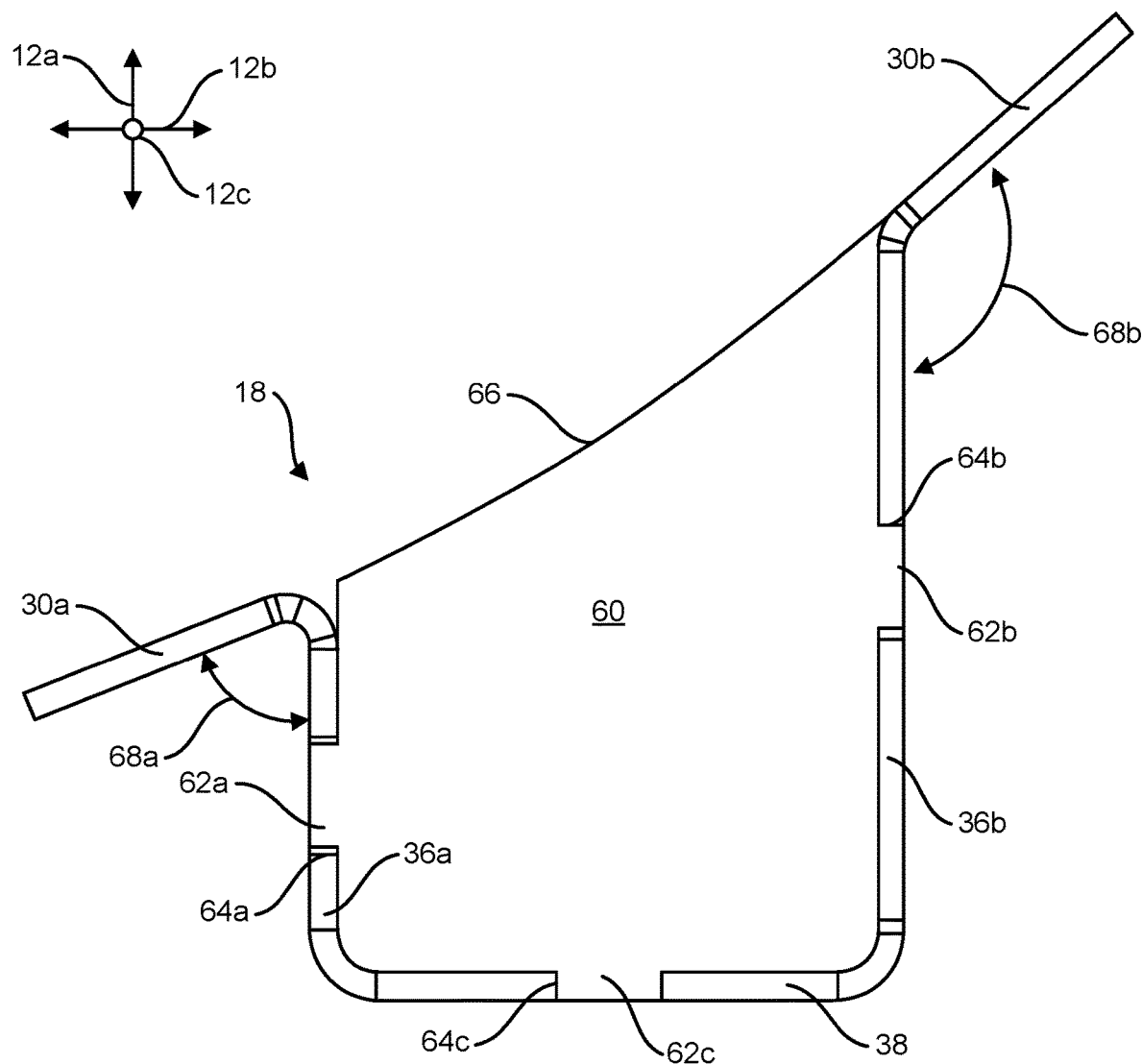
FIG. 2 shows a front view of a roller housing of a roller assembly in accordance with an embodiment of the present invention.

Referring to FIG. 2, in some embodiments, the rigidity of the roller housing 18 and cleanliness of the rollers 16 may be facilitated by securing caps 60 across an opening defined by the sidewalls 36a, 36b, bottom wall 38 and the container 20. It is not asserted that the cap 60 completely closes this opening, but rather covers substantially (e.g., 90 percent of the area of) this opening.

In the illustrated embodiment, the cap 60 is embodied as a plate defining one or more indexing structures, e.g., tabs 62a, 62b, 62c that engage corresponding indexing structures, e.g., notches 64a, 64b, 64c formed in the sidewalls 36a, 36b and bottom wall 38, respectively. The engagement of the tabs 62a, 62b, 62c in the notches 64a, 64b, 64c aligns the cap 60 relative to the walls 36a, 36b, 36c and the cap 60 may then be welded in place or secured by another fastening means.

As shown in FIG. 2, the cap 60 may define an upper edge 66, spanning across a gap between upper surfaces of the flanges 60a, 60b. The edge 66 may define a radius of curvature sized to conform to a radius of the cylinder defined by the container 20, e.g., a slightly larger (+1 to 10 mm) radius of curvature than the cylinder. Accordingly, the edge 66 may be positioned relative to surfaces of the flanges 30a, 30b that contact the container 20 such that the edge 66 either (a) does not contact the container 20 or (b) presses against the container 20 at one or more points.

As is apparent in FIG. 2 and FIG. 1B, the sidewall 36a has a shorter extent upwardly from the bottom wall 38 than the sidewall 36b. As is also apparent the angle 68a of the lower surface of the flange 30a relative to the sidewall 30a is much smaller than the angle 68b of the lower surface of the flange 30b relative to the sidewall 30b. In particular, note that angle 68a is an acute angle (less than 90 degrees) whereas angle 68b is an obtuse angle (greater than 90 degrees).

For example, for a container 20 defining a cylinder of radius of 15 units (e.g., 15 inches), and sidewalls 36a, 36b separated along the horizontal direction by 2.63 units, the angle 68a may be selected to be 69 degrees and the angle 68b may be selected to be 129 degrees in order that both flanges 30a, 30b make tangential contact with cylindrical portions of the container 20. Of course, other geometries are possible. In particular, the relative sizes of the angles 68a, 68b will decrease as the location of the roller assembly 14 moves closer to being horizontally (12b) aligned with the axis of symmetry 22.

Figure 3A:
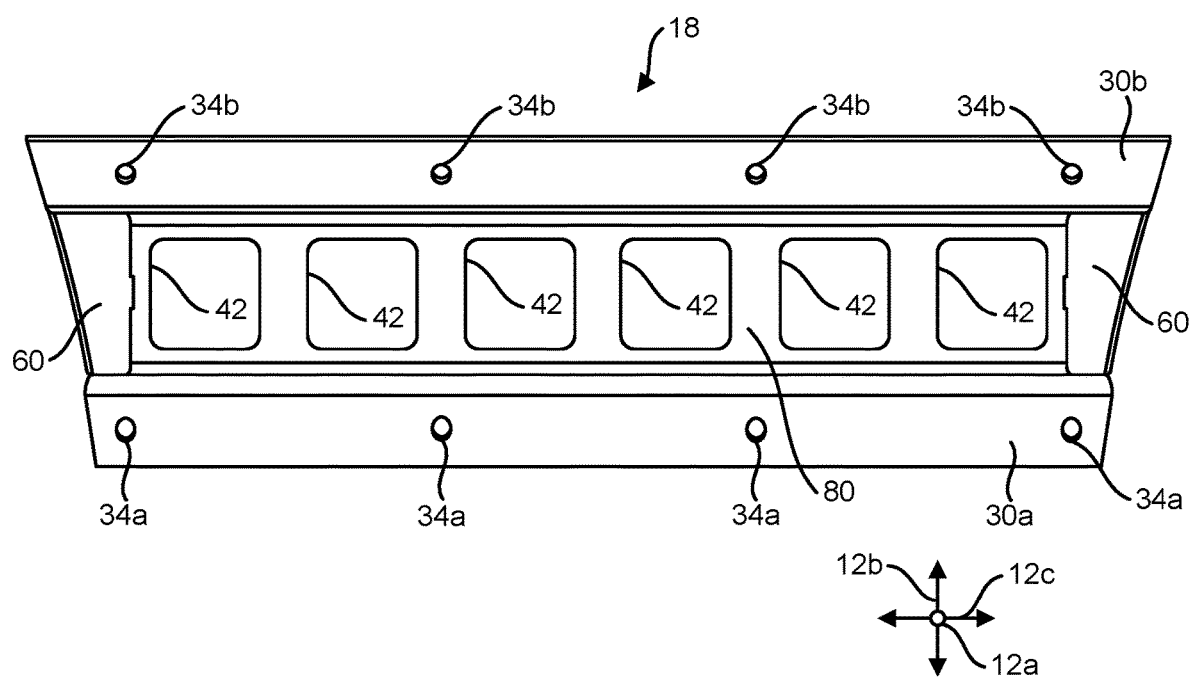
FIG. 3A is a top view of a roller housing of a roller assembly in accordance with an embodiment of the present invention.
Figure 3B:
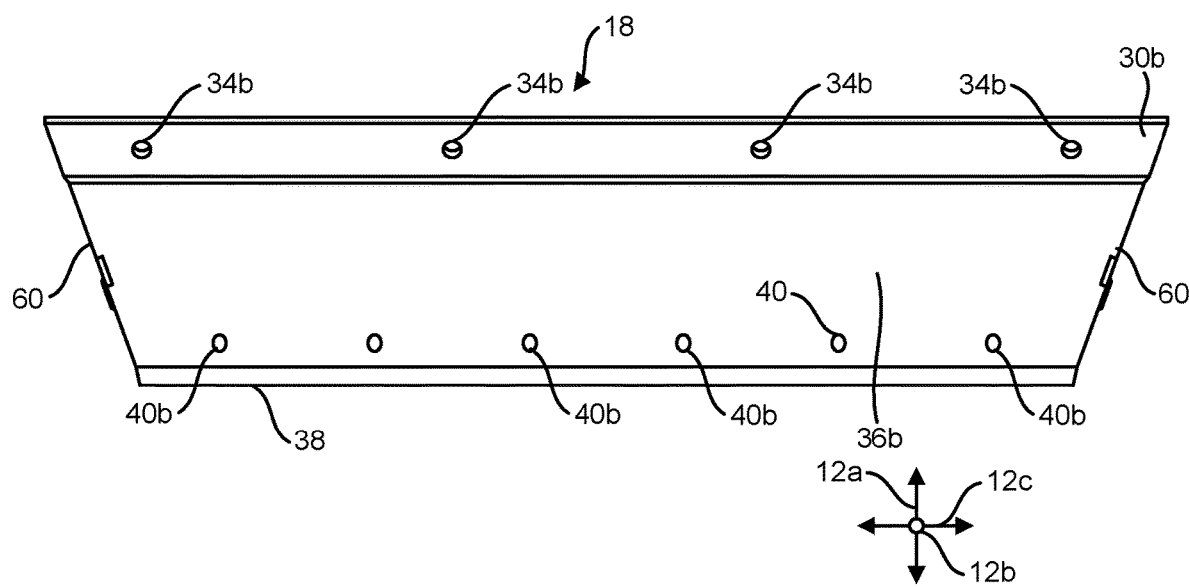
FIG. 3B is a side view of a roller housing of a roller assembly in accordance with an embodiment of the present invention.

FIG. 3A is a top view of the roller housing 18 and FIG. 3B is a side view of the roller housing 18. FIGS. 3A and 3B show the multiple flange openings 34a, 34b distributed along the flanges 30a, 30b along the longitudinal direction 12c. FIG. 3A further shows the bottom openings 42 distributed along the bottom wall 38 and having webs 80 of the bottom wall 38 positioned between adjacent openings 42. FIG. 3B further illustrates a plurality (6 in the illustrated example) of axle openings 40a formed in a sidewall 36a. A corresponding number of axle openings 40b (not shown) are formed in sidewall 36b, each being substantially aligned with one of the axle openings 36a.

FIG. 3A further illustrate that ends of the roller housing 18 may be angled in one or more dimensions. For example, FIG. 3A shows both ends of the roller housing 18 being angled in a plane parallel to the horizontal and longitudinal directions 12b, 12c. FIG. 3B shows both ends of the roller housing 18 being angled in a plane parallel to the vertical and longitudinal directions 12a, 12c. The cap 60 may be sized and shaped to cover the angled ends of the housing 18 as shown in FIGS. 3A and 3B.

In particular note in FIG. 3A that the length of the roller housing 18 along the horizontal direction may get smaller with distance from the flange 30b. Note further in FIG. 3B, that the length of the roller housing 18 along the horizontal direction may get larger with distance above the bottom wall 38. In this manner, the ends of the roller housings 14 slope outwardly with distance from the bottom wall 38 thereby providing ramp surface for guiding the roller housings 14 over obstacles, reducing the longitudinal force encountered by housing when impacting objects in the rolling path of the system 10, and generally promoting moving over obstacles.

Figure 4A:
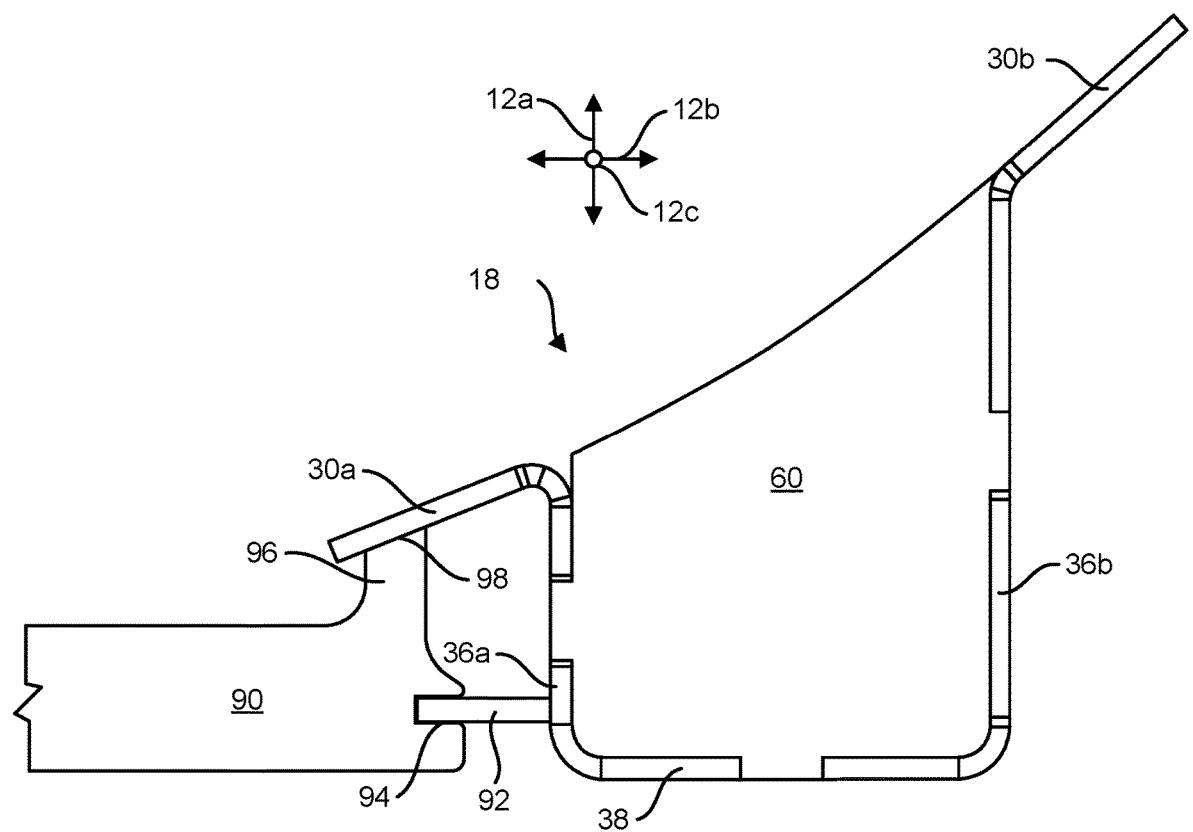
FIG. 4A is a side view of a cross brace secured to a roller housing in accordance with an embodiment of the present invention.
Figure 4B:
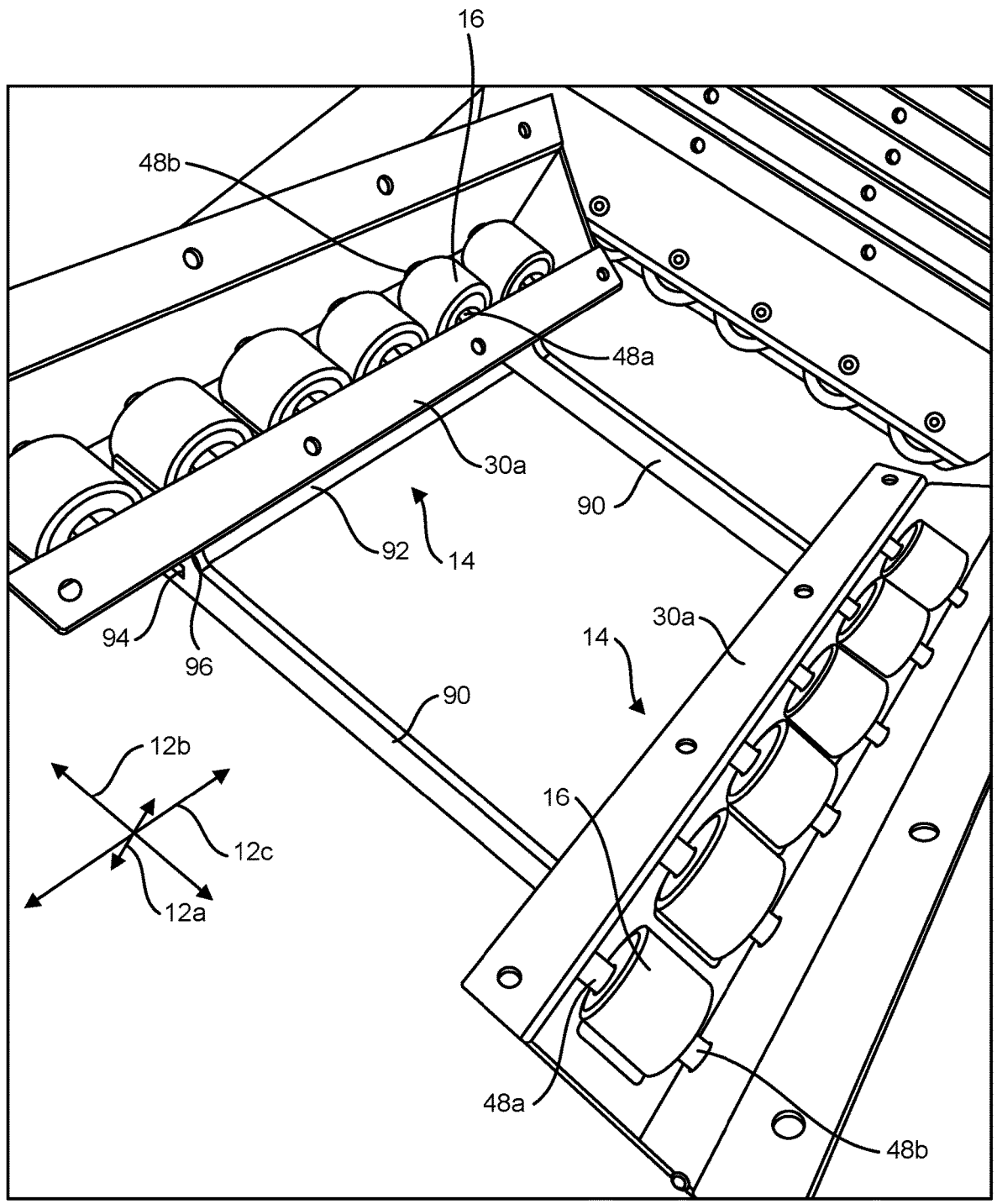
FIG. 4B is a perspective view of a pair of roller assemblies supported by a cross brace in accordance with an embodiment of the present invention.

Referring to FIGS. 4A and 4B, in some embodiments a pair of roller assemblies 14 that are positioned on either side of the container and overlapping one another along the axis of symmetry 22 may be coupled to one another by a fixture to facilitate positioning of the roller assemblies 14 relative to one another and the container 20. In the illustrated example, one or more cross braces 90 secure to the roller assemblies 14. The cross braces 90 may be embodied as rods or bars of metal or other material. Each cross brace may be fastened to the roller assemblies 14 or may be secured as a result of the position of the roller assemblies 14 being fixed due to their securement to the container. The cross braces 90 may remain attached to the roller assemblies 14 or may be removed once the roller assemblies 14 are fastened to the container 20.

For example, as shown in FIG. 4B, a rail 92 secures to the sidewall 36a of each roller assembly 14 and extends along the sidewall 36a along the longitudinal direction 12c. Both ends of the cross brace 90 may define notches 94 sized to receive the rails 92. Accordingly, when placed with the rails 92 in the notches 94 and when the roller assembly 14 is secured to the container 20, the cross braces 90 may be held in place. In other embodiments, the cross braces 90 are additionally secured to the rails 92 by means of friction fit, welds, bolts, adhesive, or other fastening means. The cross braces 90 may be sized to position the flanges 30a, 30b of the pair of roller assemblies 14 relative to one another such that the container 20 may be seated onto the flanges 30a, 30b with the flanges 30a, 30b of both assemblies 14 making substantially tangential contact.

In some embodiments, the cross brace 90 may further define a protuberance 96 or other structure at each end, each protuberance 96 having a surface 98 that is angled to conform to and contact the flange 30a of one of the roller assemblies 14 on either side of the cross brace 90 in order to support the flange 30a and facilitate positioning of the cross brace 90. With the rail 92 fastened to the sidewall 36a of the roller housing 18, the post 96 engaging the flange 30a will resist removal of the cross brace 90 when subject to pulling along the horizontal direction 12b.

In some embodiments, the securement of the rails 92 to the sidewalls 36a of the roller assemblies 14 is removable, e.g., screws, bolts, or the like. Accordingly, the rails 92 may be removed after the roller assemblies are fastened to a container 20 thereby permitting removal of the cross braces 90. Accordingly, the rails 92 and cross braces 90 are a fixture used for manufacture but are not deployed with the roller assemblies 14. In other methods of use the rails 92 and cross braces 90 remain attached during deployment.

FIG. 4B further illustrates the roller assemblies 14 having the rollers 16 installed along with the spacers 48a, 48b. In the illustrated embodiment there are six rollers 16 per roller assembly 14, but any number of rollers may be used, such as one, two three, four, five, seven, eight, or more wheels. The rollers 16 arranged in a row substantially parallel to the longitudinal direction 12c.

Figure 5:
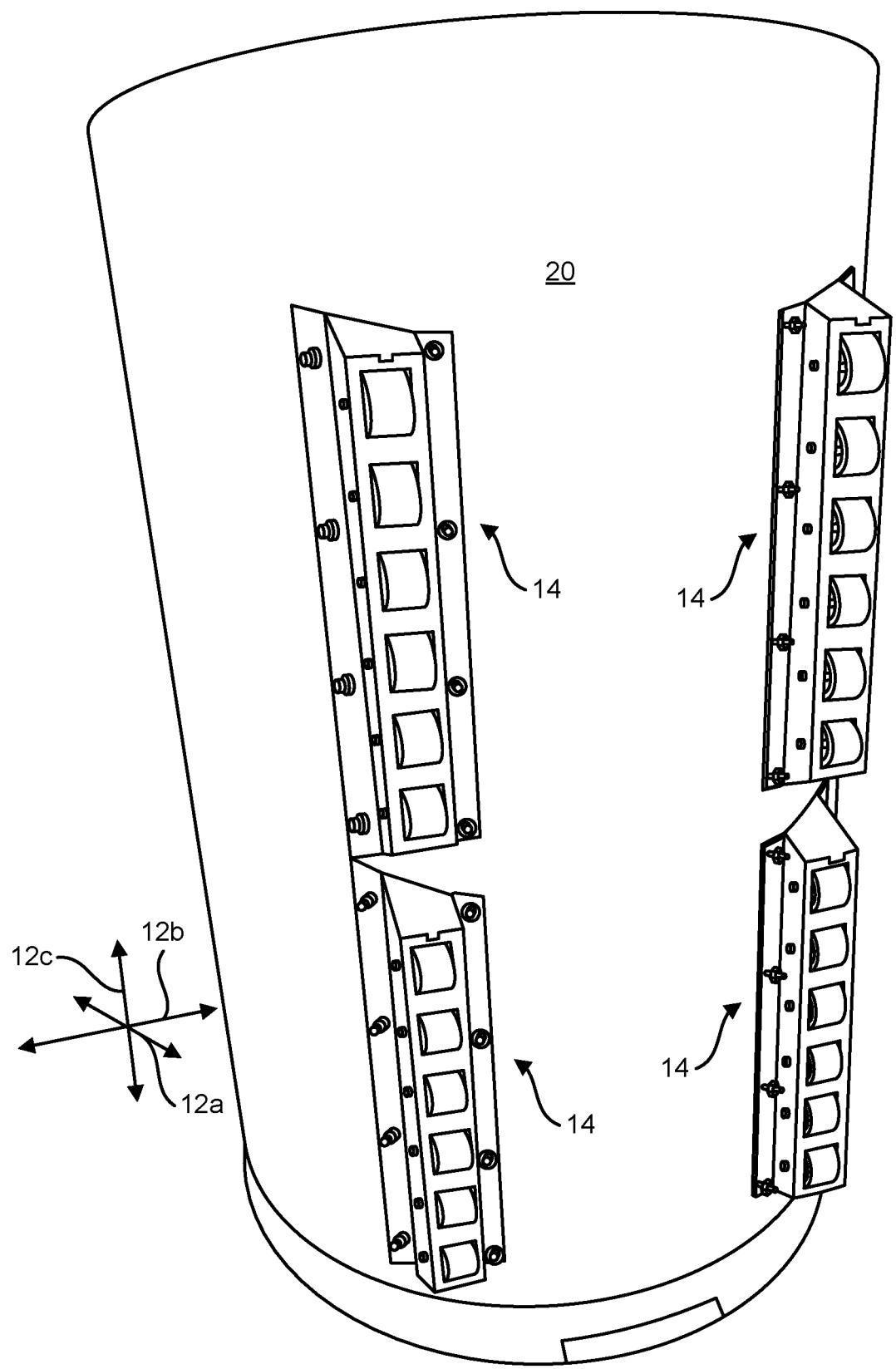
FIG. 5 is a bottom isometric view of a tubular container having a set of roller assemblies mounted thereto in accordance with an embodiment of the present invention.

FIG. 5 illustrates an example application of roller assemblies 14. One or more pairs of roller assemblies 14 may be secured to a container 20 embodied as a cardboard cylinder. For example, the container 20 may be a concrete form, such as a cylindrical cardboard tube available under the mark SONOTUBE®, at least partially filled with supplies to transport cargo by way of airlift or airdrop. Ends of the tube may be closed with appropriately sized lids fastened to the tube. Other materials may also be used such as plastic, steel, aluminum, composite material (e.g., carbon fiber, fiberglass), or the like. As is apparent in FIG. 5, two pairs of roller assemblies 14 are secured to the container 20 and positioned such that one or more rollers of each roller assembly 14 will contact a support surface. For example, the centers of all rollers 16 of all roller assemblies 14 may be within 5 mm of a common plane in order to facilitate this contact. In this manner, where the tread of the rollers 16 is cylindrical the tread of the rollers 16 will be substantially parallel to a flat support surface with which the rollers 16 are engaged. As is apparent in FIG. 16 the rollers 16 of roller assemblies 14 on a same side of the container 20 (same side of a vertical plane intersecting the axis of symmetry) are arranged in a single row substantially aligned (e.g., within 5 mm of aligned along the longitudinal direction 12c).

Figure 6:
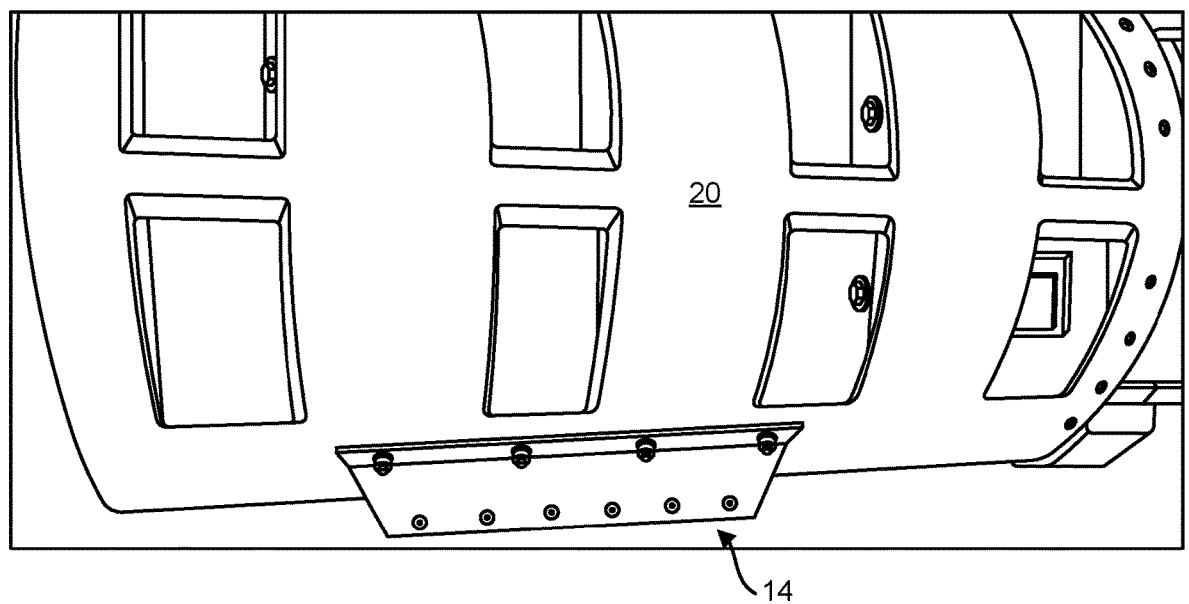
FIG. 6 is a side perspective view of a set of roller assemblies mounted to a tubular structure having an alternative shape and material.

FIG. 6 illustrates another example of a container 20 that is not completely cylindrical but includes portions of its outer surface that conform to a cylinder. Accordingly, roller assemblies 14 may secure to the cylindrical portions of such a container 20 in an identical manner to the other embodiments disclosed herein. FIG. 6 further shows a container 20 that is made of a polymer material rather than cardboard.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A system comprising:
    a container having an outer surface conforming to a cylindrical shape defining an axis of symmetry; and
    a plurality of roller assemblies mounted to the container, each of the roller assemblies having one or more wheels, the plurality of roller assemblies being mounted such that the container is supported on the one or more wheels of the plurality of roller assemblies when rested on a flat surface,
    wherein
        each roller assembly defines at least two surfaces that are tangent to the container at at least two angular positions about the axis of symmetry, and
        each roller assembly of the plurality of roller assemblies includes a plurality of wheels that are distributed in a row parallel to the axis of symmetry.

2. The system of claim 1, wherein the container is a cardboard cylinder.

3. The system of claim 1, wherein each wheel defines an axis of rotation that is perpendicular to the axis of symmetry.

4. The system of claim 1, wherein the plurality of roller assemblies include a first roller assembly and a second roller assembly that are located at overlapping positions along the axis of symmetry and located at different angular positions about the axis of symmetry.

5. The system of claim 4, further comprising a cross brace fastened to the first roller assembly and the second roller assembly.

6. The system of claim 1, wherein:
the one or more wheels of each roller assembly of the plurality of roller assemblies includes a plurality of wheels;
each roller assembly of the plurality of roller assemblies includes a roller housing including a first vertical wall and a second vertical wall, the plurality of wheels being positioned between the first vertical wall and the second vertical wall; and
the at least two surfaces include a first flange on the first vertical wall and a second flange on the second vertical wall.

7. The system of claim 6, wherein the first flange defines a first angle relative to the first vertical wall and the second flange defines a second angle relative to the second vertical wall, the second angle being greater than the first angle.

8. The system of claim 7, wherein the roller housing further comprises a bottom wall, a lower edge of the first vertical wall securing to a first edge of the bottom wall, a lower edge of the second vertical wall securing to a second edge of the bottom wall opposite the first edge, the bottom wall defining a plurality of openings and a portion of each wheel of the plurality of wheels protruding outwardly from one of the openings of the plurality of openings.

9. The system of claim 8, wherein the first vertical wall, bottom wall, second vertical wall, first flange, and second flange are formed of a single sheet of metal.

10. A roller assembly comprising:
a plurality of wheels;
a roller housing having the plurality of wheels mounted to the roller housing; and
a first flange and a second flange mounted to the roller housing, the first flange defining a first surface and the second flange defining a second surface, the first surface and second surface being angled such that both of the first surface and the second surface are positioned in contact with a cylinder defining an axis of symmetry, wherein
the plurality of wheels are distributed in a row parallel to the axis of symmetry, and
each wheel defines an axis of rotation that is perpendicular to the axis of symmetry.

11. The roller assembly of claim 10, wherein:
the roller housing includes a first vertical wall and a second vertical wall that are parallel to one another, the plurality of wheels being positioned between the first vertical wall and the second vertical wall; and
the first flange being secured to the first vertical wall and the second flange being secured to the second vertical wall.

12. The roller assembly of claim 11, wherein the first vertical wall defines first axle openings and the second vertical wall defines second axle openings, the roller assembly further comprising axles such that each axle extends through one of the first axle openings, one wheel of the plurality of wheels, and one of the second axle openings.

13. The roller assembly of claim 11, wherein the first flange defines a first angle relative to the first vertical wall and the second flange defines a second angle relative to the second vertical wall, the second angle being greater than the first angle.

14. The roller assembly of claim 13, wherein the roller housing further comprises a bottom wall, a lower edge of the first vertical wall securing to a first edge of the bottom wall, a lower edge of the second vertical wall securing to a second edge of the bottom wall opposite the first edge, the bottom wall defining a plurality of openings and a portion of each wheel of the plurality of wheels protruding outwardly from one of the openings of the plurality of openings.

15. The roller assembly of claim 14, wherein the first vertical wall, bottom wall, second vertical wall, first flange, and second flange are formed of a single sheet of metal.

16. The roller assembly of claim 14, further comprising an end cap extending between the first vertical wall and the second vertical wall, the end cap having an upper edge defining a radius of curvature sized to conform to the cylinder when in contact with the first surface and the second surface.

17. A method comprising:
providing a cylindrical concrete form defining an axis of symmetry;
providing a plurality of roller assemblies, each roller assembly comprising:
a plurality of wheels;
a roller housing having the plurality of wheels mounted to the roller housing; and
a first flange and a second flange mounted to the roller housing, the first flange defining a first surface and the second flange defining a second surface, the first surface and second surface being angled such that both of the first surface and the second surface are positioned in substantially tangential contact with the cylindrical concrete form; and
(a) fastening the first flange and the second flange of each roller assembly to the cylindrical concrete form such that a first portion of the roller assemblies are on one side of a vertical plane intersecting the axis of symmetry and a second portion of the roller assemblies are on a second side of the vertical plane opposite the first side and such that the rollers of the first portion of the roller assemblies are substantially aligned parallel to the axis of symmetry and the rollers of the second portion of the roller assemblies are substantially aligned parallel to the axis of symmetry.

18. The method of claim 17, further comprising:
positioning one or more cross braces between a roller assembly of the first portion and a roller assembly of the second portion prior to performing (a); and
following performing (a) removing the one or more cross braces.

* * * * *

UNITED STATES PATENT AND TRADEMARK OFFICE
CERTIFICATE OF CORRECTION

| | |
|---|---|
| PATENT NO. | : 11,597,563 B2 |
| APPLICATION NO. | : 16/280019 |
| DATED | : March 7, 2023 |
| INVENTOR(S) | : Dennis Sterling Becklin et al. |

It is certified that error appears in the above-identified patent and that said Letters Patent is hereby corrected as shown below:

In the Claims

In Column 10, beginning at Line 26, Claim 17 should read as follows:
17. A method comprising:
providing a cylindrical concrete form defining an axis of symmetry;
providing a plurality of roller assemblies, each roller assembly comprising:
    a plurality of wheels;
    a roller housing having the plurality of wheels mounted to the roller housing; and
    a first flange and a second flange mounted to the roller housing, the first flange defining a first surface and the second flange defining a second surface, the first surface and second surface being angled such that both of the first surface and the second surface are positioned in substantially tangential contact with the cylindrical concrete form; and
fastening the first flange and the second flange of each roller assembly to the cylindrical concrete form such that a first portion of the roller assemblies are on one side of a vertical plane intersecting the axis of symmetry and a second portion of the roller assemblies are on a second side of the vertical plane opposite the first side and such that the rollers of the first portion of the roller assemblies are substantially aligned parallel to the axis of symmetry and the rollers of the second portion of the roller assemblies are substantially aligned parallel to the axis of symmetry.

Signed and Sealed this
Twenty-fifth Day of April, 2023

Katherine Kelly Vidal
*Director of the United States Patent and Trademark Office*